United States Patent [19]

Moon et al.

[11] Patent Number: 5,228,024
[45] Date of Patent: Jul. 13, 1993

[54] MAGNETO-OPTICAL DISK POSSESSING ENHANCED ANTI-REFLECTIVE AND ANTI-OXIDATIVE PROPERTIES

[75] Inventors: Hyuk Moon, Seoul; Ki C. Kim, Kyungki, both of Rep. of Korea

[73] Assignee: Goldstar Co., Ltd., Seoul, Rep. of Korea

[21] Appl. No.: 701,783

[22] Filed: May 17, 1991

[30] Foreign Application Priority Data

May 28, 1990 [KR] Rep. of Korea .................. 7712/1990
May 31, 1990 [KR] Rep. of Korea .................. 7571/1990

[51] Int. Cl.$^5$ .................. G11B 7/24; G11B 13/04; G11B 11/12; G11B 11/10
[52] U.S. Cl. .................. 369/288; 428/694 XS; 428/900; 428/694 NF; 369/13; 369/275.2; 360/114; 360/131
[58] Field of Search .................. 369/13, 275.1–275.5, 369/288; 428/694, 695, 900; 365/122; 360/131, 135; 346/135.1, 76 L

[56] References Cited

U.S. PATENT DOCUMENTS 4,801,499  1/1989  Aoyama et al. .................. 369/13
4,920,007  4/1990  Sawamura et al. .................. 428/900

FOREIGN PATENT DOCUMENTS 63-171449  7/1988  Japan.
64-60838   3/1989  Japan.

OTHER PUBLICATIONS

Krim et al.; J. Appl. Phys. 69(8); Apr. 15, 1991; pp. 5987–5988.

*Primary Examiner*—Hoa T. Nguyen
*Attorney, Agent, or Firm*—David E. Lovejoy

[57] ABSTRACT

A magneto-optical disk comprising a polycarbonate substrate, a first protective coating coated on the polycarbonate substrate, a recording layer coated on the first protective coating, a second protective coating coated on the recording layer, a reflective layer coated on the second protective coating, wherein the first and second protective coatings comprises at least one multiple layer of $SiN_x/TiO_2/SiN_x$ layer or a coating of an amorphous $As_xS_{1-x}$ layer. The present invention can provide a magneto-optical disk of a good anti-reflection effect as a result of considerable increase of the $\theta k$ value, and a good stability against the oxidation.

2 Claims, 3 Drawing Sheets

MAGNETO-OPTICAL DISK POSSESSING ENHANCED ANTI-REFLECTIVE AND ANTI-OXIDATIVE PROPERTIES

BACKGROUND OF THE INVENTION

The present invention relates to a magneto-optical disk, and more particularly to a magneto-optical disk with protective coatings for providing anti-reflection and anti-oxidation for the disk.

A known magneto-optical disk generally comprises a substrate made of polycarbonate, a recording layer coated on the polycarbonate substrate, and at least one protective coating adapted for providing anti-reflection and anti-oxidation for the recording layer.

Referring to FIG. 1 which is a cross-sectional view illustrating a construction of an embodiment of the known magneto-optical disk, the known magneto-optical disk comprises a polycarbonate substrate 11, a first dielectric layer 12 of an optimal thickness (about 800 Å), as a protective coating, coated on the polycarbonate substrate 1, a recording layer 13 of an alloy from the amorphous RE-TM alloy (Rare Earth-Transition Metal system, TbFeCo alloy in this embodiment) coated on the first dielectric layer 12, a second dielectric layer of an optimal thickness (about 400 Å), as a protective coating, coated on the recording layer 13, and a reflective layer 15 of Al, Cr or Ti coated on the second dielectric layer 14.

In the known magneto-optical disk having the above-mentioned construction, the laser beam transmitted through the polycarbonate substrate 1 reaches to the recording layer 13 by way of the first dielectric layer 12 in order for a part thereof to be reflected on the surface of the recording layer 13, thereby causing the Kerr rotation angle $\theta k$ and the Faraday effect $\theta f$ are much influenced by refractive indexes, transmissivities and thicknesses of the first and second dielectric layers 12 and 14, for example, the $\theta k$ and $\theta f$ increase in proportion to the refractive indexes.

Each above-mentioned dielectric layer has been generally formed of SiC as carbide, $SiN_x$ and AlN as nitride, $SiO_2$, SiO and $TiO_2$ as oxide, etc . . . where each formula represents the mole ratios of the atoms. Of these dielectric materials, $TiO_2$ has not been used because it might deteriorate the quality of the recording layer and had a liability as a result of its reactivity with the oxygen in atmosphere, while it might provide a high anti-reflection effect for the recording layer, resulting from its relatively higher refractive index ranging from 2 to 3. Therefore, there has been generally used a dielectric material from $SiN_x$, especially $Si_3N_4$, in spite of its relatively lower refractive index ranging from 1.5 to 2.0, resulting in inducing relatively lower $\theta k$ and $\theta f$. For instance, it is well known that the maximum $\theta k$ of 1.2° appears when the thickness of the $SiN_x$ layer is 800 Å, which $\theta k$ value of 1.2° is deficient to provide a desired anti-reflection effect for the optical disk.

According to the above-mentioned description of the prior art, it is well noted that there is a serious drawback that the known magneto-optical disk appears a seriously low anti-reflection effect.

SUMMARY OF THE INVENTION

It is, therefore, an object of the present invention to provide a magneto-optical disk which can increase anti-reflection effect and also has a relatively higher stability resulting from its relatively higher anti-oxidation effect, thereby causing the drawback encountered in the prior art to be completely solved.

In one aspect, the present invention provides a magneto-optical disk comprising a polycarbonate substrate, a first protective coating coated on the polycarbonate substrate, a recording layer coated on the first protective coating, a second protective coating coated on the recording layer, and a reflective layer coated on the second protective coating, wherein said first and second protective coatings each comprises: at least one multiple layer of $SiN_x/TiO_2/SiN_x$ layer.

In another aspect, the present invention provides a magneto-optical disk comprising a polycarbonate substrate, a first protective coating coated on the polycarbonate substrate, a recording layer coated on the first protective coating, a second protective coating coated on the recording layer, a reflective layer coated on the second protective coating, wherein said first and second protective coatings each comprises: a coating of an amorphous $As_xS_{1-x}$ where "x" represents the percentage weight of arsenic in the material.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

The present invention resides in a magneto-optical disk with protective coatings, which coatings can increase the refractive index of the magneto-optical disk without any deterioration of the stability against the oxidation of the magneto-optical disk.

Figure 3:
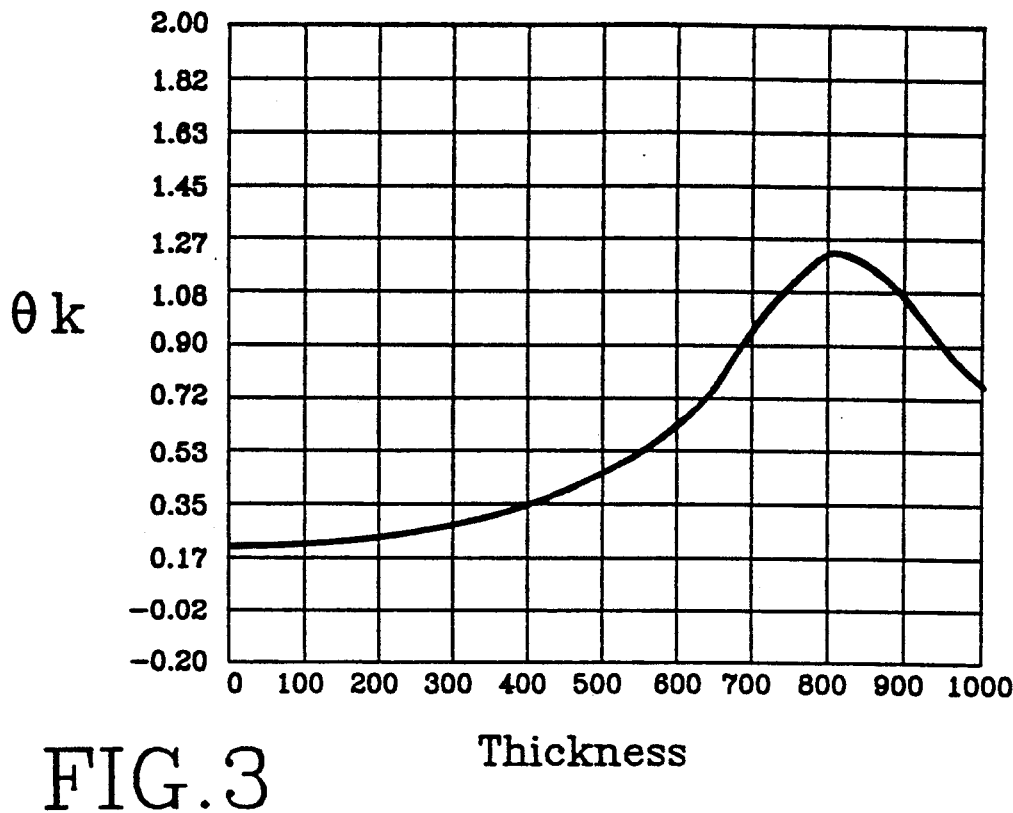
FIG. 3 is a graph illustrating a variation of $\theta k$ value in accordance with several thicknesses of $SiN_x$ layer.
Figure 4:
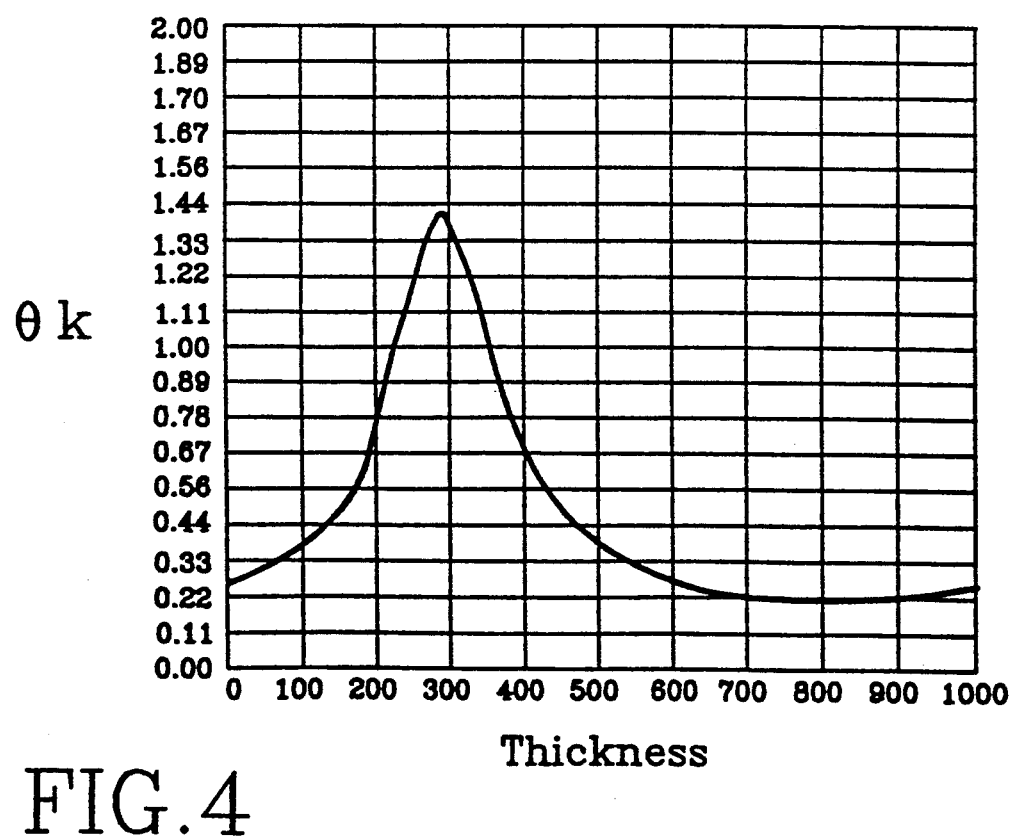
FIG. 4 is a graph illustrating a variation of $\theta k$ value in accordance with several thicknesses of $SiN_x$ layer in case of having a 200 Å thickness $TiO_2$ layer.

In accordance with an embodiment embodying the invention, the protective coating comprises at least one multiple layer, that is to say, $SiN_x/TiO_2/SiN_x$ layers. As shown in FIG. 3 which is a graph illustrating a variation of $\theta k$ value in accordance with several thicknesses of $SiN_x$ layer in case of using only one $SiN_x$ layer as the protective coating, it is represented that the maximum $\theta k$ of 1.2° appears when the thickness of the $SiN_x$ layer is 800 Å. However, said maximum θk value of 1.2° is deficient to provide a desired anti-reflection effect for the magneto-optical disk. Therefore, in an aspect, the present invention provides protective coatings each comprising three layers for the magneto-optical disk, namely, uppermost and lowermost layers each comprising the SiNx layer, and a mediate layer of $TiO_2$ layer having a relatively higher refractive index ranging from 2 to 3. Hence, the anti-reflection effect of the magneto-optical disk can be increased by the relatively higher refractive index of the mediate layer of $TiO_2$, while the mediate $TiO_2$ layer can be efficiently prevented from oxidating with the oxygen in the atmosphere, which oxidation results from an undesirable oxidation thereof, by the uppermost and lowermost SiNx layers. Referring to FIG. 4, a graph illustrating a variation of θk value in accordance with several thicknesses of SiNx layer in case of interposing a 200 Å thick $TiO_2$ layer therebetween, it is well noted that a θk value is 1.42° under a 300 Å thick SiNx layer and a 200 Å thick $TiO_2$ layer, which θk value of 1.42° shows a 17% increase over the θk value of 1.2° of the above-mentioned protective coating only comprising a SiNx layer. Furthermore, it is possible to lay several multiple layers of the above-mentioned construction for one protective coating as occasion demands.

Figure 5:
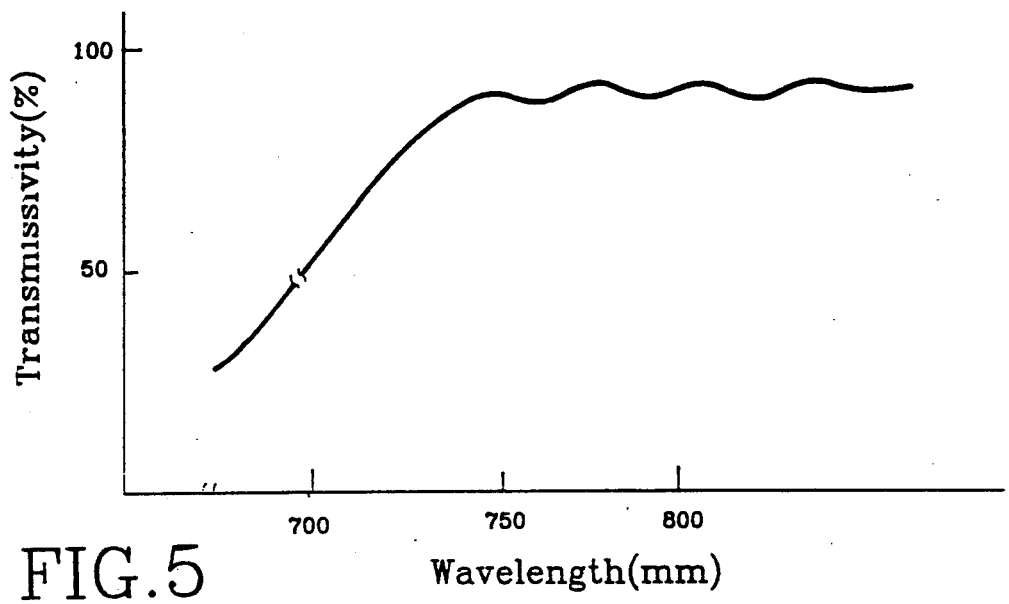
FIG. 5 is a graph illustrating a variation of the transmissivity depending on wavelengths in case of using a thin layer of $As_2S_3$, as other embodiment of a dielectric layer of a magneto-optical disk in accordance with the present invention.

In other aspect of the present invention, there may be provided protective coatings each comprising an amorphous $As_xS_{1-x}$ layer having refraction index ranging from 2.3 to 2.7. The amorphous $As_xS_{1-x}$ has a property of appearing a relatively higher transmissivity of about 90% in a wavelength region of semiconductor laser, a read light source for the magneto-optical disk, while it appears a relatively lower transmissivity in the wavelength region of the visible ray, and also such property thereof is first known by the inventor of this invention. Thus, the amorphous $As_xS_{1-x}$ can be efficiently used as a protective layer of a magneto-optical disk. For example, protective coatings each comprising a $As_2S_3$ layer of 2.5 refractive index appear relatively higher transmissivity ranging from about 90% to about 91% in wavelength region ranging about 780 mm to about 830 mm, as represented in FIG. 5. In the amorphous $As_xS_{1-x}$, the x value is selected from weight percents ranging from about 20% to about 50%, a range capable of efficiently providing a good increase of θk and a good anti-oxidation effect for the magneto-optical disk.

The magneto-optical disk with protective coatings in accordance with the invention is manufactured by the following procedure.

Figure 1:
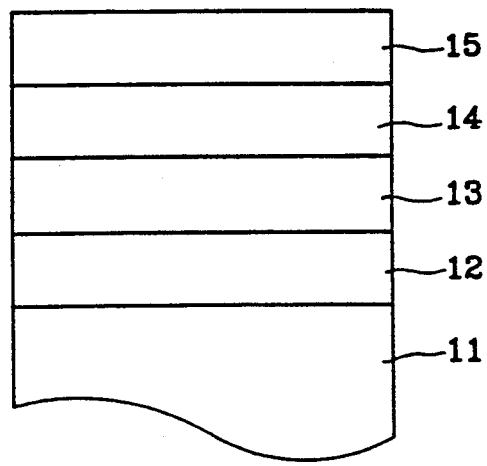
FIG. 1 is a cross sectional view illustrating a layer construction of an embodiment of the known magneto-optical disk.
Figure 2A:
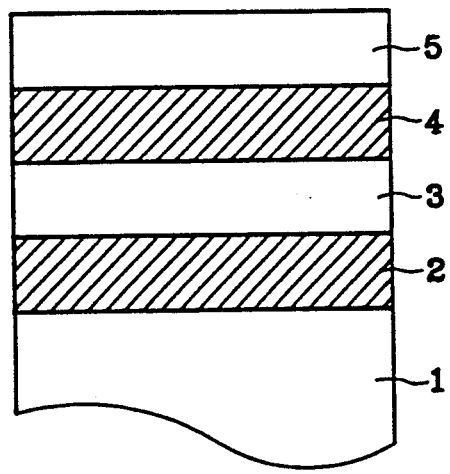
FIG. 2A is a view corresponding to FIG. 1, but showing the present invention.
Figure 2B:
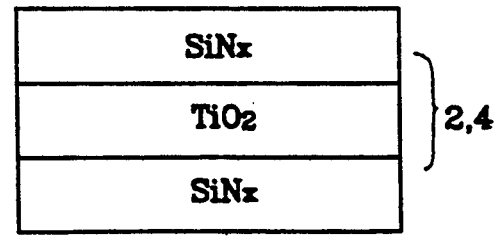
FIG. 2B is a cross sectional view illustrating a layer construction of an embodiment of a dielectric layer of a magneto-optical disk in accordance with the present invention.

A protective coating 2 of the construction as shown in FIG. 2B is first coated on a substrate comprising a polycarbonate substrate of 5.25" in diameter. At this time, the first dielectric SiNx layer, as the uppermost layer, of the protective coating is coated by RF reactive sputtering method under 7 mTorr pressure, Ar:N of 82:12 SCCM (Standard Cubic Centimeter per Minute) and a RF power of 2 KW, the second dielectric $TiO_2$ layer, as a mediate layer, is coated by RF reactive sputtering method under 5 mTorr pressure, Ar:N of 70:30 SCCM and a RF power of 1 KW, and also the third dielectric SiNx layer, as the lowermost layer, is coated by the same method under the same conditions as those in coating the first dielectric SiNx layer. The thicknesses of the above three layers are 300 Å for the first and second SiNx layers and 200 Å for the $TiO_2$ layer, respectively.

A recording layer of TbFeCo is, thereafter, coated on the protective coating under a condition of 3 mTorr pressure, Tb power of 190 W and FeCo power of 530 W in order to have a TM-rich (Transition Metal-rich) composition. The magneto-optical disk manufactured as above-mentioned procedure appears a relatively higher θk value than that of the known magneto-optical disk with protective SiNx coatings as shown in FIG. 4.

Figure 6:
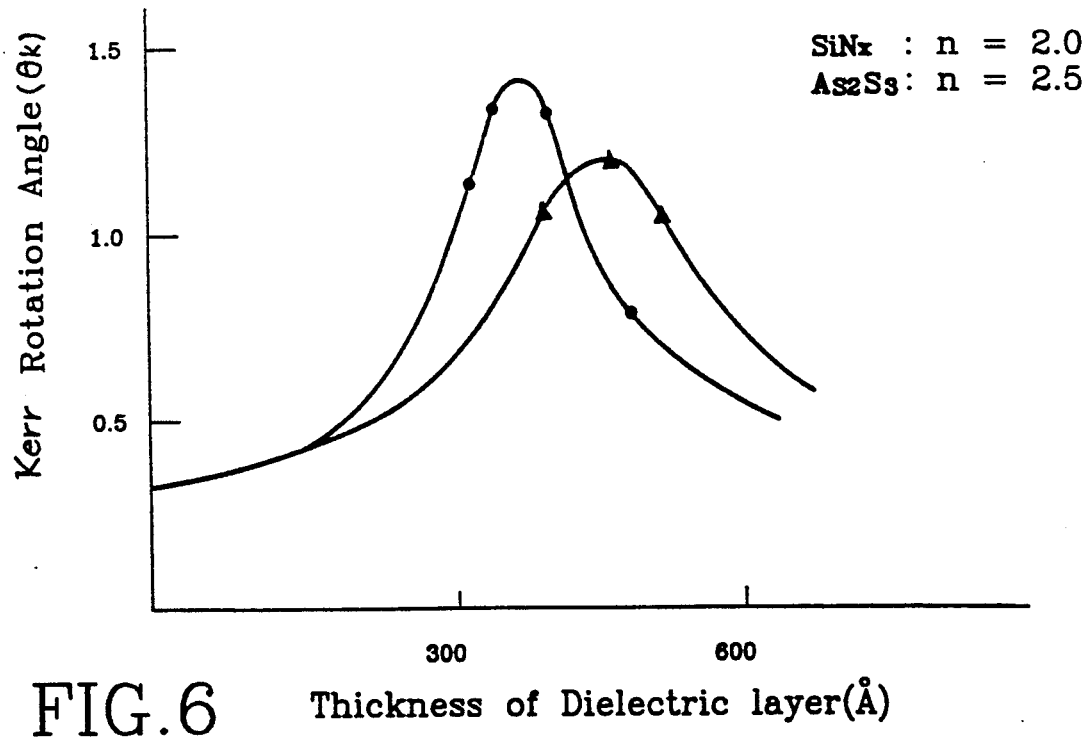
FIG. 6 is a graph relatively comparing two kerr rotation angles in cases of respectively using only $SiN_x$ as dielectric layer in accordance with the prior art and $As_2S_3$ as dielectric layer in accordance with the present invention.

Additionally, a magneto-optical disk with protective coatings each comprising a $As_2S_3$ of 2.5 refractive index instead of the above-mentioned multiple layers of SiNx/$TiO_2$/SiNx layers. At this time, the magneto-optical disk is coated with layers respectively coated by the sputtering method in order to comprise a first dielectric layer 2 of 650 Å thickness, a second dielectric layer 4 of 350 Å thickness, a recording layer 3 of 250 Å thickness and a reflective layer 5 of 500 Å thickness. It is noted that the magneto-optical disk with these layers also appears a θk value of about 1.5°, a relatively higher θk value than that of the known magneto-optical disk with protective SiNx coatings, as shown in FIG. 6.

As above described, the present invention can provide a magneto-optical disk of a good anti-reflection effect as a result of considerable increase of the θk value, and a good stability against the oxidation.

Although the preferred embodiments of the invention have been disclosed for illustrative purpose, those skilled in the art will appreciate that various modifications, additions and substitutions are possible, without departing from the scope and spirit of the invention as disclosed in the accompanying claims. For example, the present invention can be applied to the lens of glasses for increasing the anti-reflection effect thereof, while the present invention has been described for embodiments of the magneto-optical disk in the above detailed description.

What is claimed is:

1. A magneto-optical disk comprising a polycarbonate substrate, a first protective coating coated on the polycarbonate substrate, a recording layer coated on the first protective coating, a second protective coating coated on the recording layer, a reflective layer coated on the second protective coating, wherein said first and second protective coatings each comprising:

a coating of an amorphous $AsxS_{1-x}$ layer.

2. A magneto-optical disk according to claim 1, wherein, in said amorphous $AsxS_{1-x}$ layer, the constant x is weight % ranging from 20 to 50.

* * * * *